(12) United States Patent
Rappoport et al.

(10) Patent No.: US 6,369,188 B1
(45) Date of Patent: Apr. 9, 2002

(54) POLYFUNCTIONAL URETHANE- OR UREA-CONTAINING OLIGOMERS AND POLYMERS PREPARED THEREFROM

(75) Inventors: Leonid Rappoport, Mountain View; Alex Vainer, Fremont; Aleksandr Yam, Sunnyvale, all of CA (US)

(73) Assignee: Polymeright, Inc., Fremont, CA (US)

( * ) Notice: Subject to any disclaimer, the term of this patent is extended or adjusted under 35 U.S.C. 154(b) by 0 days.

(21) Appl. No.: 09/277,802

(22) Filed: Mar. 27, 1999

Related U.S. Application Data

(60) Provisional application No. 60/079,692, filed on Mar. 27, 1998.

(51) Int. Cl.[7] ............................................. C08G 18/30
(52) U.S. Cl. ............................. 528/49; 528/73; 528/75; 528/393; 549/553; 560/65; 560/66; 560/115; 560/158; 252/182.18; 252/182.2; 252/182.23
(58) Field of Search ........................... 528/393, 49, 73, 528/75; 549/553; 560/65, 66, 115, 158; 252/182.18, 182.2, 182.23

(56) References Cited

U.S. PATENT DOCUMENTS

| | | | |
|---|---|---|---|
| 3,719,638 A | 3/1973 | Huemmer et al. | 260/77.5 CR |
| 4,119,510 A | 10/1978 | Williams | 204/159.23 |
| 4,224,454 A | * 9/1980 | McDowell et al. | 560/12 |
| 4,520,185 A | 5/1985 | Tosh | 528/65 |
| 4,857,623 A | 8/1989 | Emmerling et al. | 528/28 |
| 5,484,852 A | 1/1996 | Clark | 525/333.6 |
| 5,580,947 A | 12/1996 | Brahm et al. | 528/75 |

* cited by examiner

*Primary Examiner*—Rachel Gorr
(74) *Attorney, Agent, or Firm*—Heller Ehrman White & McAuliffe LLP

(57) ABSTRACT

Polyfunctional polymerizable urethane- or urea-containing oligomers allow the design, adjustment, and regulation of chemical and physical properties of the described oligomers. The invention discloses the formulas and compositions of these oligomers, methods of their synthesis, and methods of converting the described oligomers into useful polymeric products. The described oligomers can be used for many purposes, both directly and in combination with other chemicals in multiple applications such as adhesives, sealants, coatings, composites, etc., as well as in castable and moldable materials.

3 Claims, No Drawings

POLYFUNCTIONAL URETHANE- OR UREA-CONTAINING OLIGOMERS AND POLYMERS PREPARED THEREFROM

CROSS-REFERENCE TO RELATED APPLICATIONS

This application claims the benefit under 35 USC 119(e) of Provisional Application No. 60/079,692, filed Mar. 27, 1998, which is incorporated herein by reference in its entirety.

BACKGROUND OF THE INVENTION

This invention relates to polyfunctional urethane- or urea-containing oligomers, their methods of synthesis, and polymers and compositions prepared therefrom.

One of the groups of polymers with the most attractive combination of properties that is currently used in the plastics, paint, adhesives, etc. industries are polyurethanes. The unique complex of polyurethane properties is created by the ability of the urethane groups to participate in strong intermolecular interactions.

The superior properties of polyurethanes are caused by the unique characteristics of the urethane group. Most of the other classes of polymers do not have similar complex of positive features as polyurethanes. However, the properties of the other currently manufactured polymers (from elastomers to plastics) could be significantly improved by introduction of the urethane group into the molecules of polymer.

The intention to combine the polyurethanes advantages with the inherent properties of other resins has led to the synthesis of urethane-epoxies, for example as described in Russian Patent No. 287,589 and U.S. Pat. Nos. 2,830,038, 3,984,376, 4,520,185, and 5,484,853; urethane-acrylics and urethane-methacrylics, for example as described in U.S. Pat. Nos. 3,850,770, 4,131,600, 4,133,723, 4,153,778, 4,246,391, 4,330,657, 4,339,566, 4,507,458, 4,587,201, 4,605,723, 5,006,436, and 5,616,630; urethane-alkoxysilanes, for example as described in U.S. Pat. Nos. 4,374,237, 4,555,561, and 4,857,623; and urethane-vinyls and allyls, for example as described in U.S. Pat. Nos. 3,719,638, 4,119,510, and 5,580,947.

However, the disclosed in the available literature amount of types of functional groups combined with urethanes in single oligomeric molecules is limited to the above-mentioned compounds. The range of the described products is very narrow.

Despite the obvious advantages of the described products, they are not widely used in the industrial applications. The limited amount of the utilized functional groups, difficulty in the adjustment of physical and chemical properties of products and complex and limited methods of production of described in available literature compounds lead to limitations on the range of properties of both produced oligomers and the final products obtained after their curing.

BRIEF SUMMARY OF THE INVENTION

In a first aspect, this invention provides oligomers of formula (1)

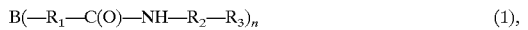    (1), where:
B is a backbone selected from the group consisting of polyesters, polyethers, polyolefins, polybutadienes, polysiloxanes, carbohydrates, polyacrylates, and mixtures and copolymers thereof;
each $R_1$, which may be the same or different, is selected from —O—, —S—, and —N($R_5$)—, where $R_5$ is selected from hydrogen or a monovalent organic radical; each $R_2$, which may be the same or different, is a bivalent organic radical; each $R_3$ is a group selected from an isocyanate group or a group of formula (2):

    (2), where:
each $R_1$ is as defined above,
each $R_4$ is a bivalent radical selected from the group consisting of bivalent aliphatic, cycloaliphatic, aromatic, substituted aliphatic, substituted cycloaliphatic, and substituted aromatic radicals, and bifunctional polyesters, polyethers, polyolefins, polybutadienes, polysiloxanes, and polyacrylates;
$f$ is a functional group, and
n is an integer from 2 to 10;
in which at least two different $R_3$ groups are present in the oligomer, and if one $R_3$ group is isocyanate, then at least three different $R_3$ groups are present in the oligomer.

In a second aspect, this invention provides mixtures of oligomers in which at least one oligomer is one of the above oligomers.

In a third aspect, this invention provides methods to produce the above oligomers.

In a fourth aspect, this invention provides polymers prepared from the above oligomers, alone or in combination with other urethane oligomers.

In a fifth aspect, this invention provides compositions such as adhesives, sealants, coatings, and composites containing these oligomers and polymers prepared therefrom.

The herein-described and claimed products and methods of their synthesis substantially widen the range of urethane- and urea-functional oligomers, expand their properties, provide mechanisms for the adjustment of these properties, and ease the production of oligomers.

DETAILED DESCRIPTION OF THE INVENTION

Definitions

A "backbone carrier" is an oligomer of formula (3):

    (3), where:
B, $R_1$, and n are as defined previously.
"Functional groups" (FGs), $f$, are groups of two types:
(1) groups capable of reaction by polymerization or polycondensation; and
(2) groups that provide desired changes in the physical and/or chemical properties of the final product.
Suitable functional groups $f$ as described in this invention are selected from reactive functional groups, including but not limited to epoxy (oxirane), acrylate, methacrylate, mercaptan, vinyloxy, allyl, carboxyl, ketone, nitrile, organic nitrate, primary, secondary and tertiary amine, organic peroxide, alkoxysilane, carbonate, aromatic, saturated and unsaturated organic radicals, halogenated organic radicals, heterocyclic radicals, and the like; catalytic, photoinitiator or stabilizer functional groups including but not limited to tertiary amines, imidazoles, organic peroxides, metalloorganic and heterocyclic radicals, hydroxyketones, hydroquinones, and the like; and physical property-modifying functional groups including but not limited to aliphatic, cycloaliphatic and aromatic, saturated and unsaturated organic radicals, halogenated organic radicals, and the like.

Functional groups $f$ are attached to the backbone of the oligomers by the use of compounds called "functional group (FG) carriers".

An "FG carrier" is a compound of formula (4):

$$f—R_4—R_1H \quad (4),$$

where $f$, $R_1$, and $R_4$ are as defined previously.

A "polyfunctional reactive urethane- or urea-containing oligomer" (PRUO) is a compound of the formula:

$$B(—R_1—C(O)—NH—R_2—R_3)_n \quad (1),$$

where:

B is a backbone selected from the group consisting of polyesters, polyethers, polyolefins, polybutadienes, polysiloxanes, carbohydrates, polyacrylates, and mixtures and copolymers thereof;

each $R_1$, which may be the same or different, is selected from —O—, —S—, and —N($R_5$)—, where $R_5$ is selected from hydrogen or a monovalent organic radical;

each $R_2$, which may be the same or different, is a bivalent organic radical;

each $R_3$ is a group selected from an isocyanate group or a group of formula (2):

$$—NH—C(O)—R_1—R_4—f \quad (2),$$

where:

each $R_1$ is as defined above, each $R_4$ is a bivalent radical selected from the group consisting of bivalent aliphatic, cycloaliphatic, aromatic, substituted aliphatic, substituted cycloaliphatic, and substituted aromatic radicals, and bifunctional polyesters, polyethers, polyolefins, polybutadienes, polysiloxanes, and polyacrylates;

$f$ is a functional group, and n is an integer from 2 to 10;

in which at least two different $R_3$ groups are present in the oligomer, and if one $R_3$ group is isocyanate, then at least three different $R_3$ groups are present in the oligomer.

The PRUOs are the oligomers of this invention. They are compounds that have multiple and diverse useful properties. These properties are determined by the type, functionality and length of the backbone, the type of linkages (urethane or substituted urea), and the types, combinations and relative amounts of functional groups on the PRUO.

In the preferred compounds of this invention:

B is a backbone selected from polyesters (for example, poly(neopentyl glycol adipate), alkyd resins, polyethylene glycol maleate, and the like), polyethers (for example, polyethylene glycol (polyoxyethylene), polyoxypropylene, polytetramethylene glycol, and the like), polyolefins (for example, castor oil, low molecular weight polyethylenes, hydrogenated polybutadiene, and the like), polybutadienes (for example, cis- and trans-polybutadienes, and acrylonitrile-polybutadiene copolymers, and the like), polysiloxanes (for example, polydimethylsiloxanes, polydiethylsiloxanes, polydiphenylsiloxanes, polyphenylmethylsiloxanes, and the like), carbohydrates (dextrins, cyclodextrins, cellulose ethers, and the like), polyacrylates (polyacrylates such as polyethylacrylate, polymethacrylates such as polymethylmethacrylate, styrenated polyacrylics, and the like), copolymers, such as block copolymers, and mixtures of two or more of the above.

$R_1$ is —O—, —S—, or —N($R_5$)—, preferably —O—.

$R_2$ is the residue of a diisocyanate molecule, for example, 2,4-toluylene, 2,6-toluylene, tetramethylene, hexamethylene, trimethylhexamethylene, isophorone, and the like.

$R_4$ is bivalent linear or branched alkyl of up to 30 carbon atoms, aryl of up to 10 carbon atoms, each optionally substituted with one or more non-interfering substituents, —($C_2H_4O$)$_x$— where x is up to 10, —($C_3H_7O$)$_y$— where y is up to 15, hydrogenated polybutadiene of MW less than 4000, polycaprolactone, and the like.

$R_5$ is hydrogen or a monovalent linear or branched aliphatic or olefinic (by which is included any degree of unsaturation) or aromatic hydrocarbon radical of up to 50 carbon atoms, preferably up to 20 carbon atoms, optionally substituted with one or more non-interfering substituents.

Typically, at least a portion of the functional groups $f$ are epoxy groups and/or acrylate or methacrylate groups.

The extent of crosslinking of the oligomer may be varied by regulating the proportion of the $R_3$ groups that are isocyanate.

The numerous possibilities of combinations of these factors allow only to provide a few descriptions of the possible oligomers (PRUOs) and their uses. Combinations of various functional groups in one oligomeric molecule allow, among other possibilities, to:

(1) In the case of a PRUO containing primarily acrylic groups and up to 10% of a ketone group that serves as an effective photoinitiator of radical polymerization, to increase the effectiveness of photopolymerization under the influence of visible and/or UV light, due to a reduction in the order of the catalytic reaction from second to first order (by virtue of the catalyst being a part of the oligomer). The possibility of migration of the catalyst from the cured material is completely eliminated.

(2) In the case of a PRUO containing primarily acrylic groups and up to 10% of an organic peroxide group that serves as an effective catalyst of radical polymerization, to reduce the order of the catalytic action reaction from second to first order, thus diminishing the necessary amount of peroxide and producing a self-curable material. The possibility of migration of the catalyst from the cured material is completely eliminated.

(3) In the case of a PRUO containing primarily epoxy groups, the addition of a noticeable (up to 40%) amount of aliphatic FGs allows a significant decrease in the viscosity of the synthesized oligomer, and increases its chemical resistance and compatibility (4) Both urethane-epoxies with free isocyanate functionality and epoxy-based MIFRI that utilize glycidol as the FG carrier provide a significant additional benefit, in that upon heating, they can cure without a separate hardener. Their self-curing is based on the intramolecular rearrangement of the urethane-epoxy groups that occurs upon the heating of the system to 80° C. and above with the formation of a six-membered oxazine structure and a hydroxyl group, or with the formation of a five-membered oxazolidone structure and a hydroxyl group. The ratio between the two type of the heterocycles depends on the type and length of the R groups in the oligomer, however, usually 65%–70% of the oxazine and 35%–30% of the oxazolidone structures are formed.

(5) Compounds containing the urethane-epoxy and isocyanate groups can be used as very effective one-package thermally cured adhesives. The hydroxyl groups formed as the result of this intramolecular rearrangement are also reactive with free isocyanate groups that are either attached to the PRUO, or may be added to it in the form of various polyisocyanates. This mechanism provides extra cross-linking to the cured PRUO.

SYNTHESIS OF THE PRUOs IN ONE STAGE

PRUOs can be synthesized in one stage by mixing together three types of precursors:

at least one backbone carrier;

at least one diisocyanate having unequal reactivity of the isocyanate groups, such as, for example, isophorone diisocyanate, 2,4-toluylene diisocyanate, or trimethyl-hexamethylene diisocyanate; and at least two different FG carriers.

It is preferred that the reactivity of the $R_1H$ groups of the FG carriers and backbone carriers towards the isocyanate groups of the diisocyanate used also shall be unequal.

SYNTHESIS OF THE PRUOs IN TWO STAGES

There are three methods to produce PRUOs in two stages.
(1) Two-stage synthesis of PRUOs through a monoisocyanate-functional reactive intermediate (MIFRI)

The first method requires the production of the monoisocyanate-functional reactive intermediate (MIFRI) as the first stage of the process.

(a) Production of the MIFRI through diisocyanates having isocyanate groups of unequal reactivity In order to produce a MIFRI, a diisocyanate having isocyanate groups of unequal reactivity, such as isophorone diisocyanate, 2,4-toluylene diisocyanate (2,4-TDI), or trimethylhexamethylene diisocyanate is mixed in 1:1 molar ratio with a FG carrier. For example, the reaction of 4-amino-tetramethylene-tri(ethoxy)-silane with 2,4-TDI produces a substituted urea bifunctional adduct intermediate with isocyanate and tri(ethoxy)silane groups. As the isocyanate group in the para-position is much more active than the isocyanate group in the meta-position, the chance of formation of a product with two tri(ethoxy)silane groups is practically eliminated.

(b) Production of a MIFRI through diisocyanates having isocyanate groups of equal reactivity If the diisocyanate has isocyanate groups of equal reactivity, such as 2,6-toluylene diisocyanate (2,6 TDI), diphenylmethane diisocyanate (MDI), aliphatic diisocyanates, etc., it is impossible to produce a MIFRI by adding FG carriers directly to the diisocyanate in a 1:1 molar ratio. In this case some the product will have two FGs, some will have one FG, and some will have none.

The only described method of producing these types of compounds is to use a huge excess of diisocyanates in the reaction mixture, to ensure that the primary product is the 1:1 product. In this case the synthesis is followed by the removal of excess diisocyanates by distillation. This technology is very expensive and cumbersome, and inevitably leaves some unreacted diisocyanate in the product.

This invention allows synthesizing a MIFRI by conducting the reaction in a non-polar solvent. Both diisocyanates and most FG carriers are soluble in non-polar solvents not containing proton-acceptor groups (for example, aliphatic hydrocarbons such as hexane).

However, after the first reaction between the diisocyanate and FG carrier is complete and a MIFRI is formed, the MIFRI reaction products (with the newly-formed very polar urethane or substituted urea groups) are insoluble in the non-polar solvents and may be removed from the reaction mixture by phase segregation, thus eliminating the possibility of reaction between the MIFRI and another molecule of FG carrier.

A mixture of two or more of the synthesized MIFRIs is later reacted with the backbone carrier producing a desired PRUO.

(2) Two-stage Synthesis of PRUOs through functional group-terminated compounds containing the uretidindione structure At the first stage of the synthesis, a diisocyanate dimer (a diisocyanate-terminated compound that contains a thermally unstable uretidindione structure and under the influence of elevated temperature decomposes to release two diisocyanate molecules—many such diisocyanate dimers are commercially available) is reacted with two or more FG carriers at a temperature below that at which the uretidindione structure decomposes (for example, not exceeding 50° C.), thereby forming a mixture of functional group-terminated compounds containing the uretidindione structure. The resulting compounds react with the backbone carrier at an elevated temperature (i.e. at a temperature above that at which the uretidindione structure decomposes) through the combination of isocyanate groups released by the break-up of the uretidindione structure and the isocyanate-reactive terminal groups of the backbone carrier.

(3) Two-stage Synthesis of PRUOs through an isocyanate-terminated prepolymer

The first stage of the synthesis is production of an isocyanate-terminated prepolymer having a functionality $\geq 2$. Such syntheses are well-described in the literature, and commercial prepolymers are widely available. At the second stage the synthesized or commercially obtained prepolymer is reacted simultaneously with two or more of the FG carriers, producing a PRUO with the desired properties.

The invention is illustrated by the following Examples, in which the percentages in brackets after the name of functional groups in the titles of examples show the percentage of the functionality of oligomer that is terminated in the said functional group.

EXAMPLE 1

One Stage Synthesis of an epoxy(90%)- and oleyl (10%)-functional PRUO with a Polybutadiene Backbone 100 g of hydroxy-terminated polybutadiene resin (Poly BD™ 45-HTLO, Elf Atochem North America) with hydroxy value 0.8 mg-eq/g, 5.75 g of glycidol (Dixie Chemical), 3.11 g of oleyl alcohol (Witcohol™ 90 NF, Witco Corp., hydroxy equivalent weight 210) and 20.4 g of isophorone diisocyanate (Luxate® IM, Arco Chemicals) were placed in a 3-neck flask with a heating mantle, stirrer and thermometer. The reaction mixture was stirred for 3 hours at 60° C. The temperature of the reaction mixture was lowered to 40° C., and 0.05 g of tin (II) 2-ethylhexanoate (Johnson Mathey Co.) was added. The temperature was raised to 50° C., and the reaction mixture was stirred at this temperature for 5 hours. Analysis of the resulting oligomer showed the presence of 0.01% residual isocyanate and an epoxy equivalent weight of 1700.

EXAMPLE 2

Two Stage Synthesis of an epoxy(90%)- and oleyl (10%)-functional PRUO with a Polytetramethylene Glycol Backbone 502 g of TDI-terminated polytetramethylene-glycol prepolymer (Andur® 2-90AP, Anderson Development Co., with 4.15% of isocyanate groups), 36.5 g of glycidol, 11 g of oleyl alcohol and 0.3 g of tin (II) 2-ethylhexanoate were placed in a 3-neck flask with a heating mantle, stirrer and thermometer. The reaction mixture was stirred for 3 hours at 80° C. The oligomer product was analyzed and found substantially isocyanate-free. The epoxy equivalent weight was 900.

The viscosity of the produced resin was three times less than that of a model system (comparative oligomer synthesized under the same conditions without the oleyl alcohol). A chemical immersion test of the methyltetrahydrophthalic anhydride (AC-220E, Lonza Corp.) for the isopropyl alcohol showed results similar to those of the model system and the limonene (BioActe® EC-7 R, Petroferm, Inc.) test results were 5 times better than that of the model system.

EXAMPLE 3

One Stage Synthesis of an epoxy(90%)- and nitrile (10%)-functional PRUO with a Polyolefin Backbone 400 g of hydrogenated castor oil (Nagarjuna Agro Tech Ltd., hydroxy value 161.84), 257.8 g of isophorone diisocyanate, 72.71 g of glycidol and 12.32 g of ethylene cyanohydrin (Morton International, Inc.) were placed in a chemical reaction vessel with a stirrer, heating mantle and thermometer. The mixture was stirred for three hours at 85° C. 0.5 g of tin(II) 2-ethylhexanoate was added, and the temperature was maintained at 85° C. for 5 hours. The product was analyzed and found substantially isocyanate-free. The epoxy equivalent weight was 700.

EXAMPLE 4

One Stage Synthesis of an epoxy(10%)- and nitrile (90%)-functional PRUO with a Polyolefin Backbone 400 g of hydrogenated castor oil, 257.8 g of isophorone diisocyanate, 12.83 g of glycidol and 69.56 g of ethylene cyanohydrin were placed in a chemical reaction vessel with a stirrer, heating mantle and thermometer. The mixture was stirred for three hours at 85° C. for 3 hours. 0.5 g of tin(II) 2-ethylhexanoate was added, and the temperature was maintained at 85° C. for 5 hours. The product was analyzed and found substantially isocyanate-free. The epoxy equivalent weight was 6400.

EXAMPLE 5

One Stage Synthesis of an acrylic(93.5%)-functional PRUO with Photoinitiator(6.5%) and a Polytetramethylene Glycol Backbone 300 g of polytetramethylene ether glycol (QO® Polymeg® 1000 Polyol, QO Chemicals, Inc.) with hydroxyl number 112.6, 146.67 g of isophorone diisocyanate, 81 g of hydroxyethyl methacrylate (HEMA, commercial grade, Bimax™ Inc.) and 8.1 g of photoinitiator—a mixture of oligo-[2-hydroxy-2-methyl- 1-[4-(1 -methylvinyl)phenyl] propanone], 70% by weight and 2-hydroxy-2-methyl-1-phenyl-1-propanone, 30% by weight (ESACURE™ KIP-100F, Sartomer Co.) were placed in a jacketed reactor with a stirrer and thermometer. The mixture was stirred for three hours at 80° C. The temperature of the reaction mixture was dropped to 40° C., and 0.3 g of tin(II) 2-ethylhexanoate was added. The temperature was raised to 60° C., and the reaction mixture was stirred at this temperature for 4 hours. The analysis showed 1.5% residual isocyanate, left intentionally in the oligomer by the quantities of reactants used.

EXAMPLE 6

Two Stage Synthesis of an acrylic(93.5%)-functional PRUO with Photoinitiator(6.5%) and a Polytetramethylene Glycol Backbone 1220 g of TDI-terminated polytetramethylene-glycol prepolymer (Airthane PET-95A, Air Products, Inc., 6.7% of isocyanate groups), 226 g of hydroxyethyl methacrylate, 25.5 of photoinitiator (ESACURE® KIP 100F, Sartomer Co.) and 0.45 g of tin(II) 2-ethylhexanoate were placed in a 3-neck flask with a heating mantle, stirrer and thermometer. The reaction mixture was stirred for 4 hours at 70° C. The product was analyzed and found substantially isocyanate-free.

Curing (polymerization) of a resin produced from this oligomer took 40% of the time for curing a model oligomer (synthesized under the same conditions without the photoinitiator) to which the same photoinitiator was added in the equivalent amount prior to curing.

EXAMPLE 7

One Stage Synthesis of an acrylic(83.5%)- and epoxy(10%)-functional PRUO with Photoinitiator (6.5%) and a Polytetramethylene Glycol Backbone 300 g of polytetramethylene ether glycol (QO® Polymeg® 1000 Polyol, QO Chemicals, Inc., with hydroxyl number 112.6), 146.67 g of isophorone diisocyanate, 72.9 g of hydroxyethyl methacrylate, 4.9 g of glycidol and 8.1 g of photoinitiator (ESACURE® KIP-100F, Sartomer Co.) were placed in a jacketed reactor with a stirrer and thermometer. The mixture was stirred for three hours at 80° C. The temperature of the reaction mixture was dropped to 40° C., and 0.3 g of tin (II)2-ethylhexanoate was added. The temperature was raised to 60° C., and the reaction mixture was stirred at this temperature for 4 hours. Analysis showed 1.5% of residual isocyanate, left intentionally in the oligomer.

The adhesion of the produced material to the silicon substrate was 80% greater than for the material described in Example 5.

EXAMPLE 8

One Stage Synthesis of an epoxy(90%)- and oleyl (10%)-functional PRUO with a Polyolefin Backbone 510 g of castor oil (Degen Oil & Chemical Co, urethane grade, hydroxy equivalent weight 399), 100.25 g of glycidol, 31 g of oleyl alcohol and 332.5 g of isophorone diisocyanate were placed in a jacketed reaction vessel with a stirrer and thermometer. The reaction mixture was stirred for 3 hours at 70° C. The temperature of the reaction mixture was dropped to 40° C., and 0.3 g of tin(II) 2-ethylhexanoate was added. The temperature was raised to 60° C., and the reaction mixture was stirred at this temperature for 4 hours. The product was analyzed and found substantially isocyanate-free, and the epoxy equivalent weight was 650.

The produced PRUO was stable at room temperature (no increase of viscosity was observed after 3 months of storage), but it cured completely after 2 hours at 180° C. with hardness 70 Shore D.

30 g of the produced PRUO was mixed with 4.5 g of MDI-based polyisocyanate (Mondur® MRS-4, Bayer Corp.). The resulting system was stable for 3 months in a sealed container at 5° C., showed excellent adhesion to silicon, glass, metals and other substrates and was completely cured after 20 minutes at 180° C.

EXAMPLE 9

Two Stage Synthesis of an epoxy(50%)-, siloxy (40%)- and oleyl(10%)-functional PRUO with a Polyolefin Backbone 500 g of castor oil, 54.6 g of glycidol, 30.5 g of oleyl alcohol and 324.5 g of isophorone diisocyanate were placed in a dried jacketed reaction vessel with a stirrer, thermometer and nitrogen flow. The reaction mixture was stirred for 3 hours at 70° C. The temperature of the reaction mixture was dropped to 40° C., and 0.3 g of tin(II) 2-ethylhexanoate was added. The temperature was raised to 60° C., and the reaction mixture was stirred at this temperature for 4 hours. The analysis showed 80% conversion of isocyanate groups. 130 g of γ-aminopropyltriethoxysilane (Silquest® A-1100® Silane, Witco Co.) was added dropwise to the reaction mixture. After another 30 minutes of mixing the product was analyzed and found substantially isocyanate-free with epoxy equivalent weight of 1330.

While this invention has been described in conjunction with specific embodiments and examples, it will be evident to one of ordinary skill in the art, having regard to this disclosure, that equivalents of the specifically disclosed materials and techniques will also be applicable to this invention; and such equivalents are intended to be included within the following claims.

What is claimed is:

1. A method of synthesis of an oligomer of formula (1)

$$B(-R_1-C(O)-NH-R_2-R_3)_n \qquad (1),$$

where:

B is a backbone selected from the group consisting of polyesters, polyethers, polyolefins, polybutadienes, polysiloxanes, carbohydrates, polyacrylates, and mixtures and copolymers thereof;

each $R_1$, which may be the same or different, is selected from $-O-$, $-S-$, and $-N(R_5)-$, where $R_5$ is selected from hydrogen or a monovalent organic radical;

each $R_2$, which may be the same or different, is a bivalent organic radical;

each $R_3$ is a group selected from an isocyanate group or a group of formula (2):

$$-NH-C(O)-R_1-R_4-f \qquad (2),$$

where:

each $R_1$ is as defined above, each $R_4$ is a bivalent radical selected from the group consisting of bivalent aliphatic, cycloaliphatic, aromatic, substituted aliphatic, substituted cycloaliphatic, and substituted aromatic radicals, and bifunctional polyesters, polyethers, polyolefins, polybutadienes, polysiloxanes, and polyacrylates;

each $f$ is a functional group, and n is an integer from 2 to 10;

in which at least two different $R_3$ groups are present in the oligomer, and if one $R_3$ group is isocyanate, then at least three different $R_3$ groups are present in the oligomer, in two stages, comprising:

(1) preparation of functional group-terminated uretidindione compounds by the reaction of two different functional group FG carriers with a diisocyanate dimer at a temperature below the decomposition temperature of the uretidindione structure; followed by (2) reaction of the functional group-terminated uretidindione compounds with a backbone carrier at an elevated temperature at which the uretidindione structure decomposes.

2. The method of synthesis of claim 1, where the sum of the $R_1H$ functionality of the FG carriers approximately equals the terminal isocyanate functionality of the diisocyanate dimer.

3. The method of synthesis of claim 1, where the total $R_1H$ functionality of the backbone carrier approximately equals the sum of the isocyanate functionality of the functional group-terminated uretidindione compounds when the uretidindione compounds decompose.

* * * * *